United States Patent

Jeong et al.

Patent Number: 5,915,053
Date of Patent: Jun. 22, 1999

[54] GRATING-ASSISTED DIRECTIONAL COUPLER FORMED A NONLINEAR THIN FILM THEREIN

[75] Inventors: Jong-Sool Jeong; Seok-Ho Song, both of Daejeon, Rep. of Korea

[73] Assignee: Electronics and Telecommunications Research Institute, Yusong-Ku, Daejeon, Rep. of Korea

[21] Appl. No.: 08/932,648

[22] Filed: Sep. 17, 1997

[30] Foreign Application Priority Data

Dec. 4, 1996 [KR] Rep. of Korea ............. 96-61700

[51] Int. Cl.[6] .................................... G02B 6/10
[52] U.S. Cl. ................. 385/37; 385/131; 385/122
[58] Field of Search .................. 385/37, 122, 129, 385/130, 131, 132, 14

[56] References Cited

U.S. PATENT DOCUMENTS

| | | | |
|---|---|---|---|
| 5,195,161 | 3/1993 | Adar et al. | 385/129 |
| 5,500,916 | 3/1996 | Cirelli et al. | 385/37 |
| 5,818,983 | 10/1998 | Yoshimura et al. | 385/14 |

OTHER PUBLICATIONS

*Nonlinear all–optical beam scanner*, Gaetano Assanto and G.I. Stegeman, Optical Sciences Center, University of Arizona, Tucson, Arizona, J. Appl. Phys. 67(3), Feb. 1, 1990, pp. 1188–1193.

*Power–dependent output properties of a nonlinear grating coupler*, Masayuki Matsumoto and Manabu Ohtsuka, Department of Communication Engineering, Osaka University, Osaka, Japan, J. Appl. Phys. 71(4), Feb. 15, 1992, pp. 2051–2053.

*Grating–assisted In GaAsP/InP vertical codirectional coupler filter*, R.C. Alferness, T.L Koch, L.L. Buhl, F. Storz, F. Heismann, and M.J.R. Martyak, AT&T Bell Laboratories, Holmdel, New Jersey, Appl. Phys. Lett. 55 (19), Nov. 6, 1989, pp. 2011–2013.

*Focusing–grating–coupler arrays for uniform and efficient signal distribution in a backboard optical interconnect*, Seok Ho Song and El Hang Lee, Applied Optics, vol. 34, No. 26, Sep. 10, 1995.

*Primary Examiner*—Hung N. Ngo
*Attorney, Agent, or Firm*—Cohen, Pontani, Lieberman & Pavane

[57] ABSTRACT

The present invention provides to a novel grating-assisted directional coupler which is capable of appending a nonlinear thin film to a conventional linear grating-assisted directional coupler, to thereby significantly improve coupling efficiency and hence design a structure having optical multistable characteristics, which comprises; a thin film nonlinear optical waveguide with third-order nonlinearity, which having a first thickness; a first linear optical waveguide formed on the thin film nonlinear optical waveguide, which having a second thickness, wherein a linear refractive index of the first linear optical waveguide is more than that of the thin film nonlinear optical waveguide; an optical waveguide grating patterned in equi-distanced on top surface of the nonlinear optical waveguide; and a second optical waveguide formed at a portion which is displaced from top surface of the first linear optical waveguide by a predetermined distance.

3 Claims, 2 Drawing Sheets

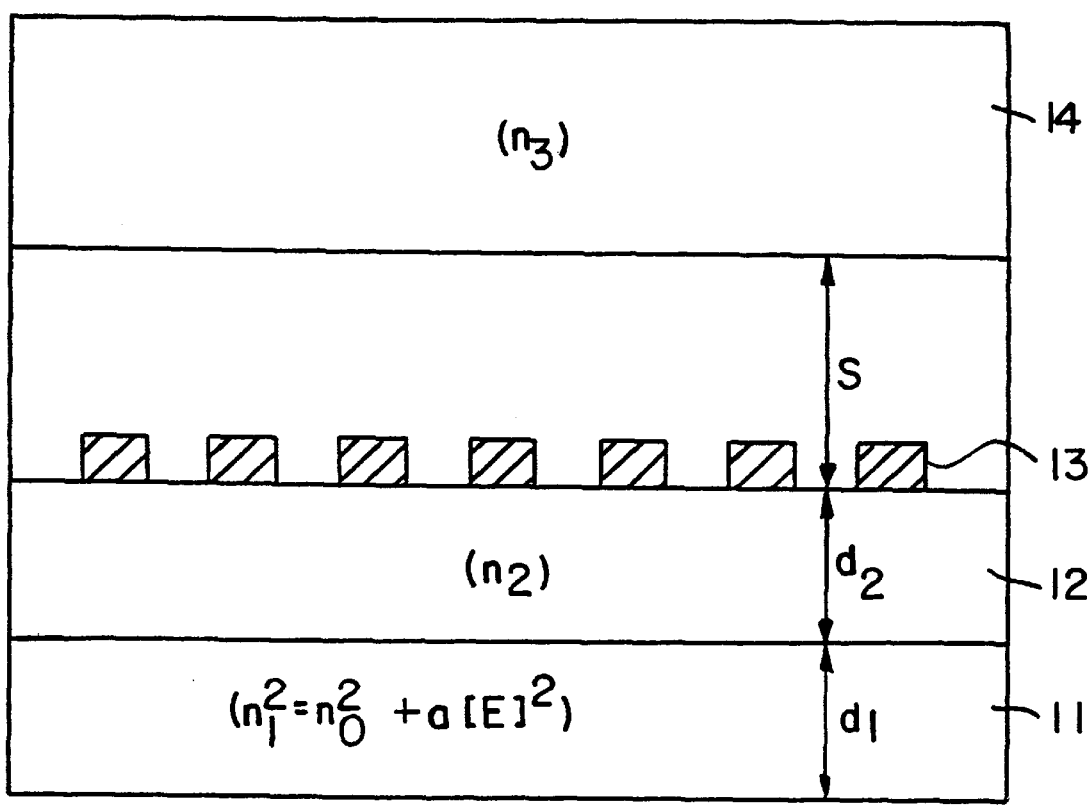

GRATING-ASSISTED DIRECTIONAL COUPLER FORMED A NONLINEAR THIN FILM THEREIN

FIELD OF THE INVENTION

The present invention relates to a novel grating-assisted directional coupler based on wavelength division multiplexing("WDM") technique for utilizing in implementation of a super highway optical signal processing network; and, more particularly, to a grating-assisted directional coupler with optical multistable characteristics, which is capable of being employed to an optical waveguide type of all-optical logic gate for a specific wavelength.

DESCRIPTION OF THE PRIOR ART

There have been introduced various structures of linear and nonlinear grating-assisted directional couplers, wherein the linear grating-assisted directional coupler has been mainly used as an optical waveguide type of filter for detecting a specific wavelength.

Recently, structures of a grating-assisted directional coupler utilizing a nonlinear medium have being used as an all-optical operation directional switching and a tunable wavelength filter. In such structures, however, since a grating structure should be formed on the nonlinear optical waveguide, it suffer from drawbacks that it is difficult to fabricate the grating-assisted directional coupler, and hence, which is difficult to obtain the optical multistable characteristics.

SUMMARY OF THE INVENTION

It is, therefore, a primary object of the present invention to provide a novel linear grating-assisted directional coupler which is capable of appending a nonlinear thin film to a conventional linear grating-assisted directional coupler, to thereby significantly improve coupling efficiency and hence design a structure having optical multistable characteristics according to the coupling efficiency.

In accordance with the invention, there is provided a novel grating-assisted directional coupler which is included a nonlinear thin film therein, which comprises; a thin film nonlinear optical waveguide with third-order nonlinearity, which having a first thickness; a first linear optical waveguide formed on the thin film nonlinear optical waveguide, which having a second thickness, wherein a linear refractive index of the first linear optical waveguide is more than that of the thin film nonlinear optical waveguide; an optical waveguide grating patterned in equi-distanced on top surface of the nonlinear optical waveguide; and a second optical waveguide formed at a portion which is displaced from top surface of the first linear optical waveguide by a predetermined distance.

BRIEF DESCRIPTION OF THE DRAWINGS

The above and other objects and features of the present invention will become apparent from the following description of preferred embodiments given in conjunction with the accompanying drawings, in which:

FIG. 1 depicts a schematic diagram representing structure of a novel grating-assisted directional coupler in accordance with a preferred embodiment of the present invention.

DETAILED DESCRIPTION OF THE PREFERRED EMBODIMENTS

Figure 2A:
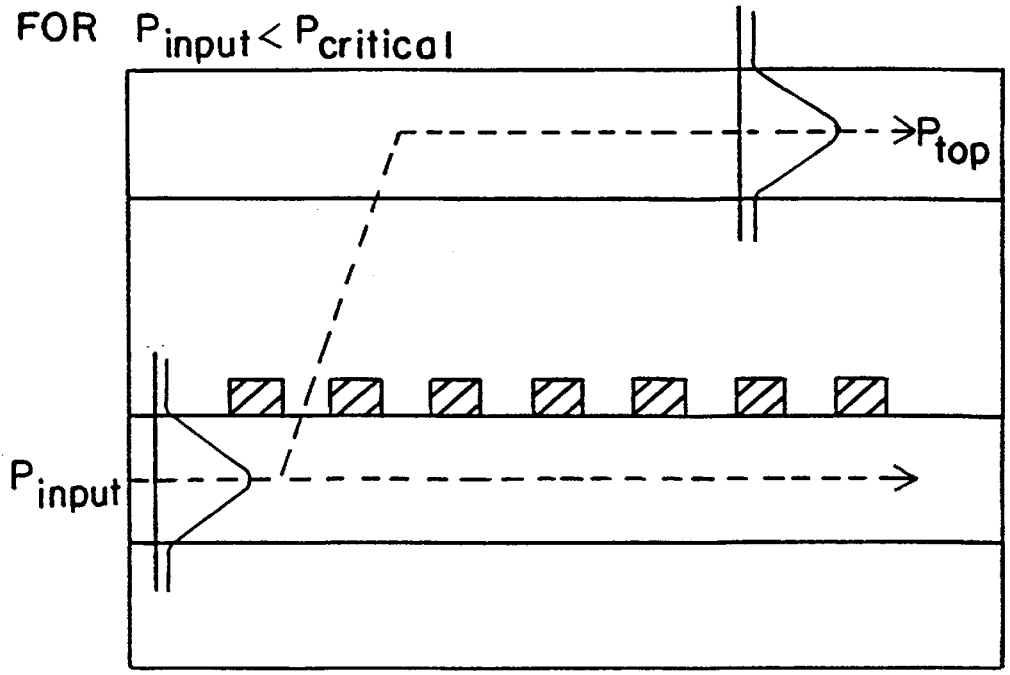
FIGS. 2A and 2B present diagrams explaining traveling path of light beam passing waveguides by controlling a power of incident light beam, respectively.

Referring to FIGS. 1 and 2, there is illustrated schematic diagrams explaining a grating-assisted directional coupler according to the present invention containing a nonlinear thin film therein, wherein like reference characters designate corresponding parts throughout the several view. A detailed description of operation characteristics and structure of the present invention will be given with reference to the above drawings.

As shown in FIG. 1, the inventive grating-assisted directional coupler consists of three optical waveguide layers, wherein there is filled with a linear medium between each waveguide. First, in the structure shown in FIG. 1, a nonlinear optical waveguide thin film 11 having third-order nonlinearity is formed on the lowest portion of the structure, wherein a nonlinear refractive index, $n_1$, of the nonlinear optical is given as below;

$$n_1^2 = n_0^2 + \alpha |E|^2$$

$\alpha$ being a nonlinear coefficient, which depends to a fluctuation of power of a traveling light beam.

Thereafter, there is formed on top surface of the nonlinear optical waveguide 11 a first linear optical waveguide 12 with a linear refractive index $n_2$ greater than that of the nonlinear optical waveguide 11, $n_1$.

Next, a number of optical waveguide gratings 13 is formed on top surface of the first linear optical waveguide 12, wherein each of the gratings is equi-distanced thereon. Finally, a second optical waveguide 14 is formed on top surface of the optical waveguide grating 13, which is displaced from top surface of the first linear optical waveguide 12 by a predetermined distance S.

Figure 2B:
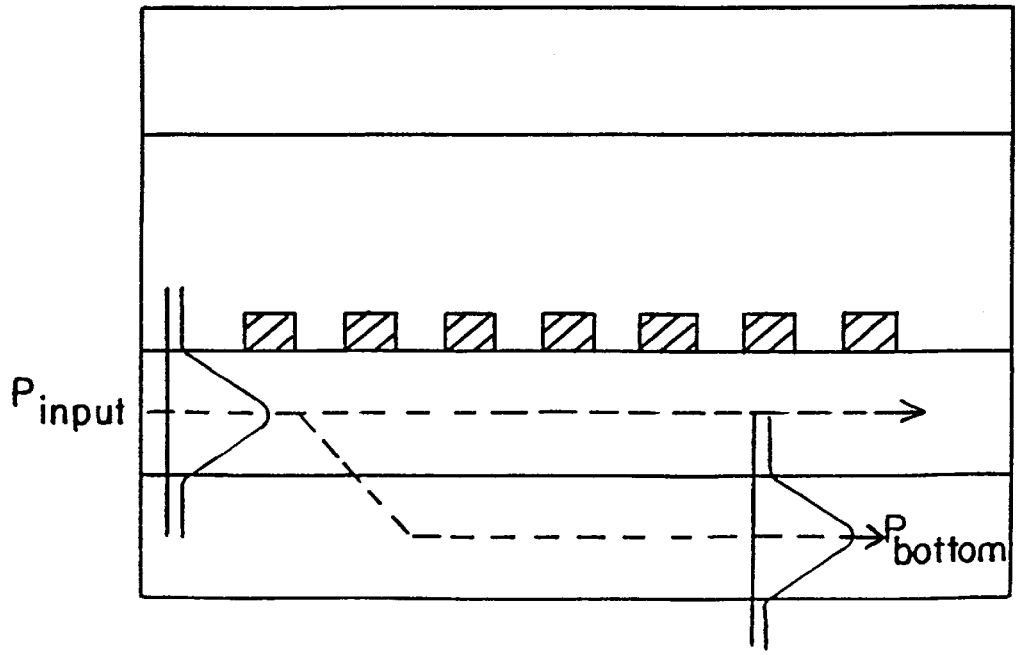

Referring turn to FIGS. 2a and 2b, there are presented diagrams explaining traveling path of light beam passing each of the waveguides in the structure response to the regulation of a power of light beam, respectively.

In FIG. 2, $P_{input}$ denotes a power of an incident light beam which is impinged onto the first linear optical waveguide 12, $P_{top}$ represents a power of traveling light beam which is introduced to the second optical waveguide 14 through the optical waveguide grating 13, and $P_{bottom}$ indicates a power of traveling light beam which is transferred to the nonlinear optical waveguide 11 formed on bottom of the structure.

In the nonlinear grating-assisted directional coupler in accordance with a preferred embodiment of the present invention, traveling path of the incident light beam to the respective waveguide can selectively be controlled by regulating the input power, $P_{input}$. A detailed description of its operating principle will be given as follows.

First, as shown in FIG. 2A, when the incident light beam with a power lower than a predetermined threshold power $P_{th}$ is impinged onto the first linear optical waveguide 12, i.e., $P_{input} < P_{th}$, since the refractive index of the nonlinear optical waveguide 11, is not more than that of the first linear optical waveguide 12, i.e., $n_1 < n_2$, the incident light beam is impinged onto inner portion of the first linear optical waveguide 12.

Subsequently, the light beam introduced to the first linear optical waveguide 12 is traveled to the second optical waveguide 14 through the optical waveguide grating 13.

In other hand, as shown in FIG.2B, when the power of the incident light beam is greater than the predetermined threshold power, i.e., $P_{input} > P_{th}$, since the refractive index of the nonlinear optical waveguide 11, is more than that of the first linear optical waveguide 12, i.e., $n_1 > n_2$, response to nonlinearity of the nonlinear optical waveguide 11, the incident light beam is transferred to the nonlinear optical waveguide 11. In this case, since the light beam transmitted to the nonlinear optical waveguide 11 is not influenced by the optical waveguide gratings 13, the light beam may be traveled along with path of the nonlinear thin film.

Accordingly, traveling path of the incident light beam can be controlled by selectively regulating a power of the incident light beam, without the regulation of an external source such as a driving voltage.

In addition, by adequately designing a thickness of the first linear optical waveguide 12 and the nonlinear optical waveguide 11, $d_2$ and $d_1$, it is possible to manufacture the inventive grating-assisted directional coupler with optical multistable characteristics.

As demonstrated above, since an output of optical signal can be controlled by selectively regulating a power of the incident light beam, the present invention may be possible to apply to a wavelength selective directional switching device with the function regulating power of an incident light beam.

Furthermore, it may be possible to manufacture the inventive grating-assisted directional coupler with optical multistable characteristics, by adequately designing a thickness of the linear optical waveguide and the nonlinear thin film provided on bottom of the structure, to thereby making it apply to an optical waveguide type all-optical logic gate.

While the present invention has been described with respect to the particular embodiments, it will be apparent to those skilled in the art that various changes and modifications may be made without departing from the spirit and scope of the invention as defined in the following claims.

What is claimed is:

1. A grating-assisted directional coupler comprising;
   a thin film nonlinear optical waveguide with a third-order nonlinearity having a first thickness and a nonlinear refractive index;
   a first linear optical waveguide formed on said thin film nonlinear optical waveguide having a second thickness and a first linear refractive index of the first linear optical waveguide, said first linear refractive index being greater than said nonlinear refractive index of said thin film nonlinear optical waveguide;
   an optical waveguide grating equidistantly patterned on a top surface of said nonlinear optical waveguide; and
   a second linear optical waveguide formed on a top surface of said optical waveguide grating which is displaced from a top surface of said first linear optical waveguide by a predetermined distance.

2. The grating-assisted directional coupler according to claim 1, wherein said nonlinear refractive index of said thin film nonlinear optical waveguide varies in response to fluctuations of a power of a light beam traveling through said thin film nonlinear optical waveguide.

3. The grating-assisted directional coupler of claim 1, wherein said grating-assisted directional coupler exhibits optical multistable characteristics responsive to said first thickness of said thin film nonlinear optical waveguide and said second thickness of said first linear optical waveguide.

\* \* \* \* \*